(12) United States Patent
Kodama et al.

(10) Patent No.: US 7,291,666 B2
(45) Date of Patent: Nov. 6, 2007

(54) EMULSION POLYMER RESIN COMPOSITION

(75) Inventors: Naoki Kodama, Mino (JP); Kunio Takahashi, Takatsuki (JP); Shidzuka Yamazawa, Ibaraki (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 10/512,157

(22) PCT Filed: Apr. 10, 2003

(86) PCT No.: PCT/JP03/04541

§ 371 (c)(1),
(2), (4) Date: Apr. 14, 2005

(87) PCT Pub. No.: WO03/091341

PCT Pub. Date: Nov. 6, 2003

(65) Prior Publication Data

US 2005/0245661 A1 Nov. 3, 2005

(30) Foreign Application Priority Data

Apr. 23, 2002 (JP) ............................. 2002-121091

(51) Int. Cl.
*C08K 3/20* (2006.01)
*C08K 3/02* (2006.01)
(52) U.S. Cl. ................. 524/457; 252/183.11; 528/210; 528/288; 528/291; 528/292
(58) Field of Classification Search ........... 252/183.11; 524/457; 528/210, 288, 291, 292
See application file for complete search history.

(56) References Cited

U.S. PATENT DOCUMENTS

| 4,525,260 | A | | 6/1985 | Abbey et al. |
| 4,959,249 | A | * | 9/1990 | Schilling et al. ............. 427/387 |
| 5,008,155 | A | * | 4/1991 | Engel et al. ................. 428/463 |
| 5,444,118 | A | | 8/1995 | Tsuruoka et al. |
| 5,565,508 | A | | 10/1996 | Hoenel et al. |
| 6,251,985 | B1 | | 6/2001 | Wamprecht et al. |
| 2004/0049000 | A1 | | 3/2004 | Okubo et al. |

FOREIGN PATENT DOCUMENTS

| JP | 50-158682 | 12/1975 |
| JP | 52-45588 | 4/1977 |
| JP | 03-109451 | 5/1991 |
| JP | 07-070431 | 3/1995 |
| JP | 07-102206 | 4/1995 |
| JP | 08-059932 | 3/1996 |
| JP | 08-259613 | 10/1996 |
| JP | 11-131017 | 5/1999 |
| JP | 2002-105396 | 4/2002 |
| JP | 2002-322412 | 11/2002 |
| WO | WO-85/00390 | 1/1985 |

* cited by examiner

*Primary Examiner*—Kriellion A Sanders
(74) *Attorney, Agent, or Firm*—Connolly Bove Lodge and Hutz

(57) ABSTRACT

The present invention has for its object to provide an emulsion polymer resin composition adapted to give a coating film having an excellent appearance in terms of gloss, image sharpness, and apparent thickness, be satisfactory in curability and storage stability, contribute to cost reduction, express satisfactory coating film properties such as hardness, high impact resistance, scratch resistance, acid rain resistance, and weather resistance, and be conducive to a reduced VOC level, a curable composition comprising the above emulsion polymer resin composition and a crosslinking agent, and a cured coating film formed from the above curable composition.

The present invention is an emulsion polymer resin composition which contains a hydroxyl group and a functional group reactive with the hydroxyl group within the same particle and has a weight average molecular weight of not less than 10000 but not more than 500000.

4 Claims, No Drawings

EMULSION POLYMER RESIN COMPOSITION

TECHNICAL FIELD

The present invention relates to an emulsion polymer resin composition, a curable composition comprising the above emulsion polymer resin composition and a crosslinking agent, and a cured coating film formed from the above curable composition. More particularly, the invention relates to an emulsion polymer resin composition which can be used with advantage in water-based coatings and the like required to give highly excellent appearances and exhibit favorable coating film properties, a curable composition comprising the above emulsion polymer resin composition and a crosslinking agent, and a cured coating film formed from the above curable composition.

BACKGROUND ART

Aqueous resin compositions are supplied in the form of emulsion composition, for instance, and by constituting water-based coatings, find application in a variety of uses; however, when such compositions are to be used in water-based clear coating compositions for automotive use, for instance, they are required to provide for excellent appearances, favorable coating film properties and availability at low cost. It should also be understood that such aqueous resin compositions are advantageous from the standpoint of cutting on volatile organic compounds (VOC).

The prior art includes the following aqueous resin compositions.

Japanese Kokai Publication Sho-50-158682 (pages 455 and 457) discloses a process for producing a vinyl polymer, which comprises suspension-polymerizing a vinyl monomer in the presence of α-methylstyrene and/or its dimer. However, precipitation of particles occurs in a water-based coating comprising the suspension polymer composition with lapse of time and some further technical sophistication is required to improve the storage stability.

Japanese Kokai Publication Hei-3-109451 (page 421) discloses a process for producing a copolymer latex which comprises emulsion-polymerizing a monomeric material comprising a conjugated diene monomer, an ethylenically unsaturated monomer and an ethylenically unsaturated carboxylic acid monomer in the presence of α-methylstyrene dimer. However, since the copolymer latex prepared by this process cannot form a coating film through crosslinking, some further technical sophistication is required to insure expression of satisfactory coating film properties such as those required of water-based clear coating compositions for automotive use.

Japanese Kokai Publication Hei-7-70431 (pages 1 to 2) discloses a synthetic resin aqueous dispersion containing (A) an ionic resin, (B) a blocked polyisocyanate and (C) a polymer formed from, by free radial polymerization, at least one kind of ethylenically unsaturated monomer. Referring to this synthetic resin aqueous dispersion, an amino-epoxy resin is mentioned as an example of the ionic resin and the dispersion is used in electrocoating materials but since the electrocoating material is an undercoating for the automotive coating, some further technological sophistication is needed for expression of the excellent appearance and good coating film properties such as those required of a water-based coating composition for use as a top coating.

Japanese Kokai Publication Hei-8-59932 (pages 1 to 2) discloses an aqueous dispersion composition which comprises an acrylic copolymer emulsion containing an acrylic copolymer, a water-soluble high polymer, a polyhydric alcohol, and a polyvalent metal compound in a defined amount. Moreover, Japanese Kokai Publication Hei-8-259613 (pages 1 to 3) discloses an anionic polymer blend having a reduced potential of bubble formation in water which comprises an acidic group-containing polymer A and a water-insoluble polymer B in the form of latex particles and being able to be produced by the emulsion polymerization of an ethylenically unsaturated compound in the presence of the polymer A. However, these compositions are intended to provide binders for water-based printing inks or an acidic group-containing polymer blend to be used as a binder for water-based print-coating and neither of them is capable of forming a coating film through crosslinking, with the result that a further technological sophistication is needed in order that they may contribute to the expression of excellent appearances and coating film properties when used in water-based coatings and the like.

Japanese Kokai Publication Hei-11-131017 (pages 2 and 12) discloses an aqueous cladding composition which comprises (i) a polyol component comprising one member selected from the group consisting of those polyesters, polyacrylates, and polyester polyacrylates which contain a hydroxyl group and a carboxyl group and have weight average molecular weights within the range of 2000 to 50000 and glass transition temperatures not below 30° C. and (ii) a polyisocyanate component comprising one member selected from the group consisting of those aliphatic isocyanates and alicyclic isocyanates which have blocked isocyanate groups. However, since this aqueous cladding composition is prepared by polymerization in a solvent, phase inversion, and desolvation in that sequence, the production process involves many steps and, hence, has room for further technological sophistication for cost reduction.

Japanese Kokai Publication Hei-7-102206 (pages 2 and 6 to 8) is directed to a water-based coating composition predominantly composed of a thermosetting resin composition comprising a crosslinking agent and an aqueous dispersion of the acrylic resin obtainable by, in an organic solvent, solution-polymerizing an acidic group-containing polymerizable unsaturated monomer, a hydroxyl group-containing polymerizable unsaturated monomer, a styrenic monomer, and one or more other polymerizable unsaturated monomers, an aqueous acrylic resin solution obtainable by solution-polymerizing the corresponding monomer in an organic solvent and converting the resulting polymer solution to an aqueous solution, in which water-based coating composition, melamine and blocked isocyanates are mentioned as species of the crosslinking agent. However, when the acrylic resin is to be provided in the form of an aqueous dispersion, a further technological sophistication is required to improve coating film properties in order that the resulting water-based coating composition may be suitable for clear coating compositions for automotive use. On the other hand, when the acrylic resin is to be provided in the form of an aqueous solution, the process inevitably involves a step for conversion to an aqueous solution so that further ingenuity is required for reducing the production cost through curtailment of the process flow or reducing the VOC level in the production stage.

Japanese Kokai Publication Hei-11-131017 referred to above (page 2) discloses a aqueous cladding composition which comprises a polyol component comprising one member selected from the group consisting of polyesters, polyacrylates, and polyester polyacrylate polyols and a polyisocyanate component comprising one member selected from the group consisting of aliphatic isocyanates and alicyclic isocyanates and a process for producing said composition. Furthermore, Japanese Kokai Publication 2002-105396 (pages 2 and 5 to 6) is directed to a water-based coating composition characterized by its containing an isocyanate compound having at least two blocked isocyanate groups in the molecular and an aminoplast resin series crosslinking agent having a methylol group or a methylol ether group in the film-forming component, said film-forming component being dispersed in water with the aid of a suspension stabilizer, in which it is disclosed that the aminoplast resin includes an N-butoxymethylacrylamide-containing resin and that the suspension stabilizer includes a hydroxyl group-containing, high-acid-value resin. However, these processes invariably involve a step for conversion to an aqueous solution or a step for removing the solvent after formation of the water-based coating composition and, therefore, some technological innovation is needed for curtailing the process flow to thereby reduce the production cost and reducing the VOC level in the production stage.

SUMMARY OF THE INVENTION

Having been developed in the above state of the art, the present invention has for its object to provide an emulsion polymer resin composition adapted to give a coating film having an excellent appearance in terms of gloss, image sharpness, and apparent thickness, be satisfactory in curability and storage stability, contribute to cost reduction, express satisfactory coating film properties such as hardness, high impact resistance, scratch resistance, acid rain resistance, and weather resistance, and be conducive to a reduced VOC level, a curable composition comprising the above emulsion polymer resin composition and a crosslinking agent, and a cured coating film formed from the above curable composition.

As the result of intensive studies on the art of emulsion polymer resin compositions, the inventors of the present invention found that when an emulsion polymer resin composition is designed to have a hydroxyl group and a functional group reactive with a hydroxyl group within the same particle and to have a weight average molecular weight of not less than 10000 but not more than 500000, the gloss, image sharpness, and apparent thickness of the coating film are improved to give an excellent appearance because of enhancement of leveling property due to a reduction in molecular weight and also that a crosslink structure is formed within the particle so that excellent coating film properties such as those required of water-based clear coating compositions for automotive use are expressed even if the molecular weight is reduced. It was also found that because the emulsion polymerization is carried out in aqueous solution, the phase inversion and desolvation after formation of the polymer composition can be dispensed with, thus contributing to curtailment of the process flow and, hence, a reduction in production cost. Thus, the inventors discovered that the above-mentioned disadvantages of the prior art can be neatly overcome. The inventors further found that when a polymerizable unsaturated monomer having a functional group reacts with a hydroxyl group is used as a monomeric component for the synthesis of the polymer and the kind of said polymerizable unsaturated monomer having a functional group reacts with a hydroxyl group is optimized, the operation and effect of the invention are more sufficiently expressed and that when a curable composition comprising said emulsion polymer resin composition and a crosslinking agent is designed with the kind of said crosslinking agent being optimized, a inter-particle crosslink structure can be formed to have the operation and effect of the invention expressed to a still greater extent. The present invention has been developed on the basis of the above findings.

The present invention, therefore, is directed to an emulsion polymer resin composition which contains a hydroxyl group and a functional group reactive with the hydroxyl group within the same particle and has a weight average molecular weight of not less than 10000 but not more than 500000.

The present invention is further directed to a curable composition comprising said emulsion polymer resin composition and a crosslinking agent, wherein said crosslinking agent is a (blocked) polyisocyanate compound and/or an aminoplast resin.

The present invention is further directed to a cured coating film formed by coating and heat-curing the above curable composition.

DISCLOSURE OF INVENTION

The present invention is now described in detail.

The emulsion polymer resin composition of the present invention comprises a hydroxyl group and a functional group capable of reacting with a hydroxyl group within the same particle. When this emulsion polymer resin composition is cured, the hydroxyl groups and functional groups capable of reacting with hydroxyl groups of the polymer react to form crosslink structures between and/or within the polymer(s) in emulsion particles produced by emulsion polymerization. Therefore, the emulsion polymer resin composition of the present invention in its application as a coating composition, for instance, is allowed to express very satisfactory coating film properties.

The above emulsion polymer resin composition preferably contains crosslinkable functional groups other than hydroxyl group which can react with hydroxyl groups to form crosslink structures in a heat-curing stage. A preferred embodiment of the invention comprises polymerizing a polymerizable unsaturated monomer composition comprising a polymerizable unsaturated monomer having a hydroxyl group and a polymerizable unsaturated monomer having a functional group reacts with a hydroxyl group to thereby introduce the hydroxyl group and the functional group reactive with the hydroxyl group into the same particle of the emulsion polymer resin composition. An alternative method comprises polymerizing, as a monomer component, a monomer having a reactive functional group to prepare a polymer and causing a different substance to react with the reactive functional group to thereby introduce the hydroxyl group and the functional group reactive with the hydroxyl group into the emulsion polymer resin composition. The ratio of equivalent amount of the functional groups of the polymerizable unsaturated monomer having a hydroxyl group to the polymerizable unsaturated monomer having a functional group reacts with a hydroxyl group in the polymerizable unsaturated monomer composition is preferably 100/5 to 100/100, more preferably 100/8 to 100/50, still more preferably 100/10 to 100/40.

The functional group capable of reacting with a hydroxyl group, referred to above, is preferably a crosslinkable functional group other than hydroxyl group which is capable of reacting with a hydroxyl group in a heat-curing stage to form a crosslink structure. More preferably, it is an alkoxyalkylamide group and/or a blocked isocyanate group. Thus, the emulsion polymer resin composition of the present invention is preferably formed from a polymerizable unsaturated monomer having a hydroxyl group and a polymerizable unsaturated monomer having an alkoxyalkylamide group and/or a blocked isocyanate group. More preferably, a polymerizable unsaturated monomer having a hydroxyl group and a polymerizable unsaturated monomer having an alkoxyalkylamide group are essential.

As the above polymerizable unsaturated monomer having a hydroxyl group, 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl acrylate (product name: 4HBA, product of Mitsubishi Chemical Corporation), 4-hydroxybutyl methacrylate, α-hydroxymethylethyl acrylate, α-hydroxymethylmethyl acrylate, caprolactone-modified hydroxy-(meth)acrylates (product name: Placcel F Series, products of Daicel Chemical Industries, Ltd.), and 4-methylolcyclohexylmethyl acrylate (product name: CHDMMA, product of Nippon Kasei Chemical Co., Ltd.), etc. are used with advantage. These may be used each independently or in a combination of two or more species. The preferred, among these, are polymerizable unsaturated monomers having a secondary hydroxyl group and more preferably, 2-hydroxypropyl (meth)acrylate. By using polymerizable unsaturated monomers having a secondary hydroxyl group, appearance of the coating film, hardness of the coating film and solvent resistance are more improved.

As the above polymerizable unsaturated monomer having an alkoxyalkylamide group, a crosslinkable (meth)acrylamide such as N-methylol(meth)acrylamide, N-methoxymethyl(meth)acrylamide, N-butoxymethyl(meth)acrylamide, or the like can be used with advantage.

As the above polymerizable unsaturated monomer having a blocked isocyanate group, one obtainable by reacting a blocking agent with 2-methacryloyloxyethyl isocyanate (product name: Karenz MOI, product of Showa Denko K.K.), methacryloyl isocyanate (product name: MAI, product of Nippon Paint Co., Ltd.), and m-isopropenyl-α,α-dimethylbenzyl isocyanate (product name: m-TMI, product of Takeda Chemical Industries, Ltd.), or the like is used with advantage.

As the blocking agent, malonate diethyl ester, ethyl acetoacetate, ε-caprolactam, butanone oxime, cyclohexanone oxime, 1,2,4-triazol, dimethyl-1,2,4-triazol, 3,5-dimethylpyrazol, imidazole or the like monofunctional blocking agent are used as the blocking agent. The blocking agents cleaved at the temperature range not higher than 160° C., more preferably not higher than 150° C. are preferably used. Butanone oxime, cyclohexanone oxime and 3,5-dimethylpyrazol are used advantageously, and especially, butanone oxime is used with advantage.

As the above-mentioned polymerizable unsaturated monomer composition preferably contains a chain transfer agent and, α-methylstyrene, α-methylstyrene dimer, terpinolene, halogen compounds such as carbon tetrachloride, chloroform, trichlorobromoethane, bromoform, etc.; disulfides such as dimethylxanthogen disulfide etc., secondary alcohols such as isopropyl alcohol, dioxane, tetrahydrofuran, isopropylbenzole, 2,4-diphenyl-4-methyl-1-pentene, γ-mercaptopropyltrimethoxysilane, t-dodecylmercaptan, n-octylmercaptan, n-dodecylmercaptan, mercaptoacetic acid, mercaptopropionic acid, 2-mercaptoethanol and the like are used with advantage. These may be used each independently or in a combination of two or more species.

The above-mentioned chain transfer agent preferably contains α-methylstyrene as an essential component and, more preferably, contains α-methylstyrene as a main component. Thus, the emulsion polymer resin composition of the invention is preferably one obtainable by polymerizing a polymerizable unsaturated monomer composition containing α-methylstyrene as an essential component. To "contain α-methylstyrene as a main component" means that the chain transfer agent contains α-methylstyrene in a proportion of not less than 50 mass %, preferably not less than 80 mass %. α-Methylstyrene may be used in combination with one or more other chain transfer agents. The use of α-methylstyrene as a main component is advantageous in that the malodor resulting from the use of a mercaptan in combination is mitigated.

The α-methylstyrene content in 100 mass % of the polymerizable unsaturated monomer composition is preferably not less than 1 mass % but not more than 50 mass %. If the content is less than 1 mass %, the polymer will gain in molecular weight so remarkably as to adversely affect the appearance parameters of the coating film and if it exceeds 50 mass %, the polymerization velocity will be low and the polymerization may not be carried to completion. The more preferred content is not less than 5 mass % but not more than 30 mass %. The content of said other chain transfer agent or agents which may be used in combination with α-methylstyrene is not more than 2 mass %, more preferably not more than 1 mass %, based on 100 mass % of the polymerizable unsaturated monomer composition.

The polymerizable unsaturated monomer composition described above may contain other monomers in addition to said polymerizable unsaturated monomer having a crosslinkable functional group.

As preferred examples of said other monomers, there can be mentioned carboxylic acid-containing polymerizable unsaturated monomers such as acrylic acid, methacrylic acid, maleic acid, fumaric acid, crotonic acid, itaconic acid, citraconic acid, maleic anhydride, monomethyl maleate, monobutyl maleate, monomethyl itaconate, monobutyl itaconate, vinyl benzoate, monohydroxyethyl (meth)acrylate oxalic acid, dimethyl maleate, diethyl maleate, dibutyl maleate, dimethyl fumarate, diethyl fumarate, dibutyl fumarate, carboxyl-terminal caprolactone-modified acrylate (product name: Placcel FA series, product of Daicel Chemical Industries, Ltd.), carboxyl-terminal caprolactone-modified methacrylate (product name: Placcel FMA series, product of Daicel Chemical Industries, Ltd.), 2-(meth)acryloyloxyethyl succinic acid, 2-(meth)acryloyloxyethyl hexahydrophthalic acid, etc.; epoxy group-containing polymerizable unsaturated monomers such as glycidyl(meth)acrylate, α-methylglycidyl acrylate, glycidyl allyl ether, oxocyclohexylmethyl (meth)acrylate, 3,4-epoxycyclohexylmethyl acrylate (product name: CYCLOMER A200, product of Daicel Chemical Industries, Ltd.), α-methylglycidyl methacrylate (product name: M-GMA, product of Daicel Chemical Industries, Ltd.), 3,4-epoxycyclohexylmethyl methacrylate (product name: CYCLOMER M100, product of Daicel Chemical Industries, Ltd.), etc.; (meth)acrylic esters such as methyl (meth)acrylate, ethyl (meth)acrylate, n-butyl(meth)acrylate, isobutyl (meth)acrylate, tert-butyl(meth)acrylate, 2-ethylhexyl (meth)acrylate, cyclohexyl(meth)acrylate, n-lauryl (meth)acrylate, benzyl(meth)acrylate, isobornyl (meth)acrylate, 4-methylcyclohexylmethyl (meth)acrylate, etc.; aromatic unsaturated monomers such as styrene, vinyltoluene, etc.; nitrogen-containing unsaturated monomers such as N,N'-dimethylaminoethyl (meth)acrylate, (meth)acrylamide, N-phenylmaleimide, N-cyclohexylmaleimide, N-vinylpyridine, N-vinylimidazole, etc.; unsaturated cyanides such as (meth)acrylonitrile etc.; vinyl esters such as vinyl acetate, vinyl butyrate, etc.; fluorine-containing unsaturated monomers such as trifluoroethyl (meth)acrylate, tetrafluoropropyl (meth)acrylate, etc.; vinyl ethers such as vinyl methyl ether, vinyl ethyl ether, etc.; polyfunctional unsaturated monomers such as ethylene glycol diacrylate, neopentyl glycol diacrylate, polypropylene glycol #400 diacrylate, etc.; reactive benzotriazole series ultraviolet-absorbing monomers (disclosed in e.g. Japanese Kokai Publication Hei-8-151415) such as [2'-hydroxy-5'-(meth)acryloyloxyethylphenyl]-2H-benzotriazole, 2-[2'-hydroxy-5'-(meth)acryloyloxypropylphenyl]-2H-benzotriazole, commercial RUVA-93 (product of Otsuka Chemical Co., Ltd.), etc.; reactive benzophenone series ultraviolet-absorbing monomers such as 2-hydroxy-4-methacryloxybenzophenone, 2-hydroxy-4-(2-hydroxy-3-methacryloyloxy)propoxybenzophenone, etc.; reactive ultraviolet-stabilized monomers (disclosed in e.g. Japanese Kokai Publication Hei-1-261409) such as 4-(meth)acryloyloxy-2,2,6,6-tetramethylpiperidine, 4-(meth)acryloyloxy-1,2,2,6,6-pentamethylpiperidine, commercial Adekastab LA-82 and LA-87 (products of Asahi Denka Co., Ltd.), commercial FA-711 MM and FA-712 HM (products of Hitachi Chemical Co., Ltd.), and so on.

The weight average molecular weight of the polymer constituting the emulsion polymer resin composition of the present invention is preferably not less than 10000 but not more than 500000. If it is less than 10000, the water resistance and solvent resistance will be adversely affected, and if it exceeds 500000, the leveling properties will deteriorate to detract from appearance. It is more preferably not less than 20000 but not more than 400000, still more preferably not less than 30000 but not more than 300000, especially preferably not more than 200000. In this specification, the term "weight average molecular weight" means the weight average molecular weight on a polystyrene equivalent basis as determined by gel permeation chromatography.

The above emulsion polymer resin composition is preferably such that the (1) glass transition temperature (Tg) on the whole polymer basis, (2) average particle diameter, (3) acid value, (4) hydroxyl value, and (5) number of carboxyl groups and functional groups other than hydroxyl groups have been set within the respective preferred ranges. When one or more of these parameters are set within the respective preferred ranges, the operation and effect of the invention are more sufficiently expressed.

The above-mentioned (1) glass transition temperature (Tg) on the whole polymer basis is preferably not lower than −20° C. but not higher than 100° C. For application of the invention to automotive clear top coatings, Tg is preferably not lower than −10° C. but not higher than 80° C., more preferably not higher than 50° C., still more preferably not higher than 25° C.

The glass transition temperature (Tg) on the whole polymer basis is preferably calculated by means of the following equation of Fox.

$$1/Tg = \Sigma(Wn/Tgn)/100$$

where Wn represents the mass % of the polymerizable unsaturated monomer n present in 100 mass % of the polymerizable unsaturated monomer composition; and Tgn represents the Tg (absolute temperature) of the homopolymer composed of the polymerizable unsaturated monomer n.

The above (2) average particle diameter is preferably not less than 30 nm but not more than 500 nm. If it is less than 30 nm, agglomeration tends to occur during polymerization, and if it exceeds 500 nm, the resulting coating film tends to be insufficient in water resistance. The more preferred range is not less than 50 nm but not more than 300 nm.

The above (3) acid value is preferably not higher than 50 mgKOH/g. If it is less than 50 mgKOH/g, the emulsion polymerization reaction tends to proceed only with difficulty so that the emulsion polymer resin composition may not be obtained in a practically useful concentration. The more preferred acid value is not higher than 30 mgKOH/g.

The above (4) hydroxyl value is preferably not lower than 20 mgKOH/g but not higher than 180 mgKOH/g. If it is lower than 20 mgKOH/g, the degree of crosslinking for coating film formation tends to be inadequate so that the desired coating film characteristics may not be obtained, and if it exceeds 180 mgKOH/g, the emulsion polymerization tends to become difficult to proceed so that the emulsion polymer resin composition may not be obtained in a practically useful concentration. The more preferred hydroxyl value is not lower than 40 mgKOH/g but not higher than 150 mgKOH/g.

Referring to the (5) number of functional groups other than carboxyl groups and hydroxyl groups, the polymerizable unsaturated monomer having a functional group other than carboxyl group and hydroxyl group preferably accounts for not more than 30 mass % relative to 100 mass % of the total polymerizable unsaturated monomer component.

While the emulsion polymer resin composition of the invention can be produced by an emulsion polymerization reaction, this emulsion polymerization reaction is carried out in aqueous solution and, therefore, there is no need for phase inversion and desolvation following formation of the polymer composition, with the consequent advantage that the production flow can be curtailed and the production cost reduced.

As the emulsion polymerization reaction for the formation of the emulsion polymer resin composition of the invention, various known emulsion polymerization techniques involving the use of an emulsifier can be employed. For example, the polymerization method in which a polymerization initiator, an aqueous medium, and an emulsifier are fed together and the polymerization reaction is carried out, the so-called monomer dripping method, and the preemulsion method, etc., can be employed. Furthermore, multi-stage polymerization techniques such as seed polymerization, core-shell polymerization, power-feed polymerization, etc. may be employed so that the resulting crosslinkable functional group-containing polymer may have a heterogenous structure.

In a preferred emulsion polymerization, an aqueous medium, an emulsifier, said polymerizable unsaturated monomer composition preferably containing a chain transfer agent, a polymerization initiator, etc. are caused to react at 40 to 100° C. for 1 to 20 hours. When the Tg on the whole polymer basis is not lower than −10° C., a multi-stage polymerization protocol providing for a Tg differential is used with advantage. By using such a protocol, the appearance of the coating film can be further improved. Among the multi-stage compositions (the polymers formed in the respective stages of polymerization reaction) obtainable according to said multi-stage polymerization protocol, it is preferred that the polymer having Tg of not higher than 70° C. as the component having the lowest Tg value is formed and that the polymer having Tg of not lower than 0° C. as the component having the highest Tg value is formed. According to this mode, the low Tg component imparts good leveling property to the coating film embodying the invention, while the high Tg component imparts hardness to the coating film embodying the present invention. The mass ratio of the high Tg component and low Tg component (high Tg component/low Tg component) is preferably 10/90 to 40/60, more preferably 20/80 to 35/65. The polymer obtained by such a multi-stage polymerization reaction may have been partially crosslinked.

The above polymerization initiator includes water-soluble azo compounds such as 2,2'-azobisisobutyronitrile, 2,2'-azobis(2-amidinopropane)dihydrochloride, 4,4'-azobis(4-cyanopentanoic acid), etc.; persulfates such as ammonium persulfate, potassium persulfate, etc.; and peroxides such as hydrogen peroxide, peracetic acid, benzoyl peroxide, di-t-butyl peroxide, t-butylhydro peroxide, etc. These may be used each independently or in a combination of two or more species. The amount of use of the polymerization initiator is preferably 0.1 to 10 mass % based on the total weight of the polymerizable unsaturated monomer composition. Moreover, when the polymerization velocity is to be accelerated or the polymerization is carried out at a low temperature, a reducing agent such as sodium bisulfite, ferrous chloride, an ascorbic acid salt, Rongalit, thiourea dioxide (product name: Tec light, product of Asahi Denka Co., Ltd.) or the like may be used.

As the aqueous medium referred to above, water is usually employed and, where necessary, a lower alcohol, a ketone or the like hydrophilic solvent can be used in combination. The amount of use of the aqueous medium can be appropriately selected so that solid content in the resulting curable composition will be the desired content.

As to the emulsifier referred to above, anionic surfactants, nonionic surfactants, cationic surfactants, amphoteric surfactants, high polymer surfactants, and polymerizable surfactants containing at least one polymerizable carbon-carbon unsaturated bond in the molecular can be used with advantage. These may be used each independently or in a combination of two or more species.

As the above anionic surfactants, there can preferably be mentioned alkali metal alkylsulfates such as sodium dodecyl sulfate, potassium dodecyl sulfate, etc.; ammonium alkylsulfates such as ammonium dodecyl sulfate etc.; sodium dodecyl polyglycol ether sulfate, sulfonated paraffin alkali metal salts; alkylsulfonates such as sulfonated paraffin ammonium salt etc.; fatty acid salts such as sodium laurate, triethanolamine oleate, triethanolamine abietate, etc.; alkylarylsulfonates such as sodium dodecylbenzenesulfonate, alkylphenol hydroxyethylene alkali metal sulfates, etc.; higher alkyl naphthalenesulfonates, naphthalenesulfonic acid-formaldehyde condensate, dialkyl sulfosuccinates, polyoxyethylene alkylsulfates, polyoxyethylene alkylarylsulfates, and so on.

As the above nonionic surfactants, polyoxyethylene alkyl ethers, polyoxyethylene alkylaryl ethers, sorbitan fatty acid esters, polyoxyethylene sorbitan fatty acid esters, fatty acid monoglycerides such as glycerol monolaurate etc., poly(oxyethylene-co-oxypropylene), and condensation products of ethylene oxide with aliphatic amines, amides or acids, etc. are used with advantage.

As the above cationic surfactants, alkylpyridinium chlorides and alkylammonium chlorides are used with advantage.

As the above amphoteric surfactants, lauryl betaine, stearyl betaine, lauryldimethylamine oxide, and others are used with advantage.

As the above high polymer surfactants, polyvinyl alcohol, poly(sodium (meth)acrylate), poly(potassium (meth)acrylate), poly(ammonium (meth)acrylate), poly(hydroxyethyl (meth)acrylate), poly(hydroxypropyl (meth)acrylate), copolymers of two or more constituent polymerizable monomers of said polymers or copolymers of such monomers with other kinds of monomers, and phase transfer catalysts such as crown ethers and the like are used with advantage.

As the polymerizable surfactants, anionic polymerizable surfactants such as sodium propenyl-2-ethylhexyl benzenesulfosuccinate, polyoxyethylene (meth)acrylate sulfate ester, polyoxyethylene alkylpropenyl ether sulfate ammonium salt, phosphate ester of polyoxyethylene (meth)acrylic ester, etc.; and nonionic polymerizable surfactants such as polyoxyethylene alkylbenzene ether (meth)acrylic ester, polyoxyethylene alkyl ether (meth)acrylic ester, etc. are preferably used.

The amount of use (total amount) of said emulsifier is preferably 0.5 to 10 mass % based on the total mass of the polymerizable unsaturated monomer composition to be used.

In the above emulsion polymerization process, the polymer may be neutralized with a neutralizing agent, and this neutralizing agent may be any known neutralizer that is used for neutralization of acidic groups but is preferably selected from among alkali metal compounds such as sodium hydroxide, potassium hydroxide, etc.; alkaline earth metal compounds such as calcium hydroxide, calcium carbonate, etc.; ammonia; and organic amines such as dimethylethanolamine, monomethylamine, dimethylamine, trimethylamine, monoethylamine, diethylamine, triethylamine, monopropylamine, dimethylpropylamine, monoethanolamine, diethanolamine, triethanolamine, ethylenediamine, diethylenetriamine, etc. These may be used each independently or in a combination of two or more species.

In the case that sulfonate group or sulfate, and/or ethyleneoxide chain derived from the polymerization initiator or the emulsifier are present in the resin, alkali metal compounds or alkaline earth metal compounds are preferably used in order to prevent heat-yellowing. The amount of use thereof is preferably 0.5 to 4 equivalent based on the total amount of sulfonate group, sulfate and the like being present in the resin. If it is less than 0.5 equivalent, effect on heat-yellowing prevention is not obtained and if it exceeds 4 equivalent, water resistance may decrease.

The neutralizing agent used with these are preferably ammonia or triethylamine having low boiling point, in view of the suppression of the decrease in water resistance.

The amount of addition of said neutralizing agent is preferably the amount which is sufficient to bring the acrylic emulsion to pH 3 to 10. If the pH is below pH 3, the acrylic emulsion tends to be decreased in stability and mechanical stability. If pH 10 is exceeded, practical troubles such as a decrease in water resistance and emanation of an odor tend to take place. The more preferred range is pH 4 to 9.5.

While the curable composition of the invention comprises said emulsion polymer resin composition and a crosslinking agent, the crosslinking agent may be whichever of a substance that initiates a crosslinking reaction at atmospheric temperature and a substance that initiates a crosslinking reaction when heated; thus, an aqueous dispersion type (blocked) polyisocyanate, an aminoplast resin can be used with advantage. These may be used each independently or in a combination of two or more species. Among these, the aqueous dispersion type (blocked) polyisocyanate is preferred. The term "aqueous dispersion type" as used herein means the embodiment dispersible into water, namely, the state in which a (blocked) polyisocyanate has been dispersed into water in an O/W form and such a dispersion is prepared by adding the (blocked) polyisocyanate to water and stirring the mixture mechanically with a stirrer, a hand-mixer or the like. The term "(blocked) polyisocyanate" means a polyisocyanate and/or a blocked polyisocyanate. Further, a resin with oxazoline groups may be used in combination in order to improve water resistance or scratch resistance by reacting the resin with carboxyl groups in the reaction system.

The above aqueous dispersion type polyisocyanate may be one obtainable by dispersing a water-dispersible polyisocyanate rendered soluble in water by the addition of a poly(ethylene oxide) chain and dispersed with an anionic or nonionic dispersant, and water resistance can be improved by further using water-indispersible polyisocyanate in combination.

To avoid yellowing of the coating film, the polyisocyanate is preferably a non-yellowing polyisocyanate compound not containing an isocyanate group directly attached to an aromatic ring. As the above-mentioned non-yellowing polyisocyanate compound, diisocyanates such as hexamethylene diisocyanate, isophrone diisocyanate, etc.; polyisocyanate derivatives such as adduct polyisocyanates e.g. trimethylolpropane adduct form, biuret form, isocyanurate form and the like of these diisocyanate, can be mentioned. These may be used independently or in combination of two or more species.

As said aqueous dispersion type polyisocyanate, there can be mentioned Aquanate 100, Aquanate 110, Aquanate 200, and Aquanate 210 (product name, all are products of Nippon Polyurethane Industry Co.); Bayhydur TPLS-2032 and SUB-isocyanate L801 (product name, both are products of Sumika Bayer Urethane Co., Ltd.); Takenate WD-720, Takenate WD-725, and Takenate WD-220 (product name, all products of Mitsui Takeda Chemicals, Inc.); and Leathermin D-56 (product name, product of Dainichiseika Cloro & Chemicals Mfg. Co., Ltd.) etc. These may be used independently or in a combination of two or more species.

As the water-indispersible polyisocyanate which is to be blended with the above aqueous dispersion type polyisocyanate, ones usually used as the high-solid type compound in solvent system are preferred and Desmodur N3400, Desmodur N3600, Desmodur VPLS2294 (product name, products of Sumika Bayer Urethane Co., Ltd.), Takenate D-170HN (product name, product of Mitsui Takeda Chemicals, Inc.) and the like are used with advantage. These may be used independently or in a combination of two or more species.

Concrete examples of the formulation of the aqueous dispersion type polyisocyanate and water-indispersible polyisocyanate include one obtainable by formulating Takenate WD-725 (product name, product of Mitsui Takeda Chemicals, Inc.) as the aqueous dispersion type polyisocyanate and Desmodur VPLS2294 (product name, product of Sumika Bayer Urethane Co., Ltd.) as the water-indispersible polyisocyanate in an amount of 4:1 (weight ratio).

The aqueous dispersion type blocked polyisocyanate is prepared, for causing crosslinking to take place on heating the curable composition to dryness and insuring enhanced storage stability at atmospheric temperature, usually by blocking the isocyanate groups of an aqueous dispersion type polyisocyanate with a blocking agent.

As the above blocking agent, malonate diethyl ester, ethyl acetoacetate, ε-caprolactam, butanone oxime, cyclohexanone oxime, 1,2,4-triazol, dimethyl-1,2,4-triazol, 3,5-dimethylpyrazol, imidazole or the like monofunctional blocking agent are used as the blocking agent. The blocking agents cleaved at the temperature range not higher than 160° C., more preferably not higher than 150° C. are preferably used. Butanone oxime, cyclohexanone oxime and 3,5-dimethylpyrazol are used advantageously, and especially, butanone oxime is used with advantage.

As preferred examples of said aqueous dispersion type blocked polyisocyanate, there can be mentioned Takenate WB-720, Takenate WB-730, Takenate WB-920 (product name, all are products of Mitsui Takeda Chemicals, Inc.); Bayhydur BL116, Bayhydur BL5140, Bayhydur BL5235, and Bayhydur TPLS2186, Desmodur VPLS2310 (product name, all are products of Sumika Bayer Urethane Co., Ltd.), etc. These may be used each independently or in a combination of two or more species.

The above aqueous dispersion type (blocked) polyisocyanate can be used with an organic solvent added therewith.

When said aqueous dispersion type (blocked) polyisocyanate is used as the crosslinking agent and the curable composition of the invention is caused to cure, the hydroxyl group of the polymerizable unsaturated monomer reacts with the isocyanate group to form an urethane bridge to thereby form inter-particle crosslink structure. For the curable composition of the invention, not only inter-particle crosslink structure but also curing by urethane bridge and/or amide bridge be utilized as intra-particle crosslink structure. The intra-particle crosslink structure contributes to favorable characteristics such as improved solvent resistance and water resistance. The term "amide bridge" is the crosslink structure formed by the alcohol-eliminating reaction between the alkoxyalkylamide group and hydroxyl group or the self-condensation reaction between alkoxyalkylamide groups.

The above alkoxyalkylamide group reacts with a hydroxyl group under strongly acidic conditions. If the reaction takes place during polymerization, crosslinking reaction is proceeded to unfavorable extent and the molecular weight will be increased unduly to adversely affect the appearance, therefore, in the case where the alkoxyalkylamide group is involved in polymerization, it is preferable to control pH to not less than 4 by using a neutralizing agent so that the gain in molecular weight may be avoided.

As examples of said resin with oxazoline groups, water-soluble type resins such as EPOCROS WS-500, WS-700, etc. and emulsion type resins such as EPOCROS K-2010, K-2020, and K-2030 (product name, all are products of Nippon Shokubai Co., Ltd.) can be mentioned. The particularly preferred is a water-soluble type resin which is highly reactive with the main component.

The equivalent ratio of the functional groups present in the crosslinking agent to the functional groups present in the emulsion polymer resin composition in the curable composition of the invention is preferably 0.5 to 2.5, more preferably 0.8 to 2, still more preferably 1 to 1.8.

While the curable composition of the invention is obtained by blending the above-described components, the curable composition of the present invention is preferably prepared by blending the main component containing the polymer having crosslinkable functional groups etc. with the crosslinking agent immediately before use in the case where a polyisocyanate is used as the crosslinking agent because the crosslinking reaction of the constituent polymer etc. of the invention with the crosslinking agent can then be initiated at atmospheric temperature; and when the crosslinking agent comprises a blocked polyisocyanate, the crosslinking reaction begins upon high-temperature treatment, such as baking, so that said constituent components may be blended at any point of time but it is preferable that the curable composition be prepared by blending the main component containing the polymer having crosslinkable functional groups etc. with the crosslinking agent in the end-product manufacturing stage. When the crosslink structures are formed by baking, the solvent resistance and water resistance are enhanced so that the satisfactory coating film properties will be exhibited.

The curable composition of the invention preferably has a solids concentration of not less than 20 mass % and more preferred range is not less than 30 mass %.

Where necessary, the above curable composition may contain pigments, additives, solvents, and the like. As said additives, there can be mentioned leveling agents, ultraviolet absorbers, ultraviolet stabilizers, antioxidants, polymerization inhibitors, fillers, coupling agents, rustproofing agents, antibacterial agents, metal inactivating agents, wetting agents, antifoaming agents, surfactants, reinforcements, plasticizers, lubricants, antifogging agents, corrosion inhibitors, pigment dispersants, rheology modifiers, peroxide decomposing agents, matrix bleaches, fluorescent whiteners, organic flameproofing agents, inorganic flameproofing agents, antisagging agents, melt flow modifiers, antistatic agents, antialgal agents, antifungal agents, fire retardants, slip agents, metal chelating agents, antiblocking agents, heat stabilizers, processing stabilizers, colorants, and so forth.

As the solvents mentioned above, organic solvents can be employed for improving film-forming properties within the range not detracting from the effect of the invention. Since the present invention provides for good film-forming properties, it is sufficient to use only a reduced amount of any organic solvent as compared with the prior art, with the result that the VOC release can be decreased.

The cured coating film of the present invention can be formed by coating the curable composition described above to a substrate and curing the same.

The substrate mentioned above includes inorganic substrates such as glass, slate, concrete, mortar, ceramics, stone, etc.; metal substrates such as metal sheets comprising aluminum, iron, zinc, tin, copper, titanium, stainless steel, galvanized iron, tinned iron, and the like, metals plated on its surface with zinc, copper, or chrome, metals treated on its surface with chromic acid, phosphoric acid or the like; plastic substrates such as polyethylene, poly(vinyl chloride), acrylonitrile-butadiene-styrene copolymer (ABS), fiber-reinforced plastics (FRP), poly(ethylene terephthalate), polycarbonate, poly(methyl methacrylate), polystyrene, polypropylene, polyesters, polyolefins, acrylic resins, epoxy resins, nylon resins, etc.; artificial leather; wooden materials such as cypress, cedar, pine woods, and plywood; and organic substrates such as textiles and paper. Prior to coat with the curable composition, these substrates may be pre-coated with the conventional primer, base coating, intermediate coating, and metallic-base or other top coating.

The coating technology upon obtaining the coating film from the above curable composition and curing technology of the coating film can be appropriately selected according to the intended use of the curable composition. As the coating technology, coating methods by immersion coating, brush coating, roll-brush coating, spray coating, roller coating, spin coating, dip coating, bar coating, flow coating, electrostatic coating, die coating, and the like are used with advantage.

The curing method includes curing at atmospheric temperature and heat-curing, and the curing conditions can be appropriately selected according to the intended use of the curable composition of the invention. The thickness of the coating film to be formed from said curable composition may be appropriately selected according to the intended use of the composition. The coating film hardness should also vary with different uses for the coating film and, therefore, the formulating amount of the structural components, the reaction conditions and the like, should be judiciously selected so as to tailor the coating film to the required hardness value. For application of the composition as an automotive clear coating, the heating temperature is preferably not lower than 100° C. but not higher than 180° C., the coating film thickness is preferably not less than 20 µm but not more than 100 µm, and the coating film hardness is preferably not lower than F grade. More preferably, the heating temperature is not lower than 120° C. but not higher than 160° C., the film thickness is preferably not less than 25 µm but not more than 60 µm.

The curable composition of the invention can be used as undercoating, intermediate coating or top coating materials for various plastic molded articles, household electrical appliances, steel-made articles, large structures, road vehicles (for example, solid color coatings, metallic base coatings, or clear top coatings for automotive repair use), aircraft, architectural members and buildings, roofing tiles, woodworking, etc., particularly used with advantage as clear coatings for automotive use. These coatings crosslink and cure on heat treatment, for instance, to give coating films having excellent appearances outstanding in gloss, image sharpness, apparent thickness, etc. and exhibiting good coating film properties such as hardness, impact resistance, scratch resistance, acid rain resistance, and weather resistance, and the like.

BEST MODE FOR CARRYING OUT THE INVENTION

The following examples illustrate the present invention in further detail without defining the scope of the invention. Unless otherwise indicated, all parts are parts by weight and all percents (%) are mass %.

1. Method for Preparation of Resin Compositions

EXAMPLE 1

Resin Composition (1)

A flask equipped with a dropping funnel, stirrer, nitrogen gas inlet pipe, thermometer, and reflux condenser was charged with 212.6 g of deionized water.

In the dropping funnel, a preemulsion for first-stage polymerization was prepared from 31.6 g of 20% aqueous solution of the emulsifier "Aquaron BC-20" (product of Dai-Ichi Kogyo Seiyaku Co., Ltd.; hereinafter referred to as "Aquaron BC-20"), 58.4 g of deionized water, 50.4 g of t-butyl methacrylate, 53.3 g of 2-ethylhexyl acrylate, 21.0 g of styrene, 58.4 g of hydroxyethyl methacrylate, 4.8 g of methacrylic acid, 21.0 g of α-methylstyrene and 1.0 g of mercaprtopropionic acid, and a 27.0 g (9%) portion of this preemulsion was added to the flask. While nitrogen gas was gently bubbled through the mixture, the temperature was increased to 85° C. under stirring. After this increase of temperature, 10.0 g of 3% aqueous solution of potassium persulfate was fed to the flask to initiate polymerization. At this point of time the internal temperature of the reaction system was increased to 90° C. over 30 minutes. The process up to this stage is termed prepolymerization.

After completion of prepolymerization, with the internal temperature of the reaction system being maintained at 90° C., the remainder of the above preemulsion prepared for the first stage of polymerization and 61.6 g of 3% aqueous solution of potassium persulfate were uniformly added dropwise over 125 minutes. After dropwise addition, the dropping funnel was washed with 5.3 g of deionized water and the washings were added into the flask to complete the first-stage polymerization and give composition (1A).

Then, 8.9 g of 10% aqueous solution of sodium hydroxide and 1.1 g of triethylamine were added to the above composition (1A) and the mixture was stirred at the same temperature for 30 minutes.

Thereafter, a preemulsion for a second-stage of polymerization as prepared from 13.6 g of 20% aqueous solution of Aquaron BC-20, 25.0 g of deionized water, 33.9 g of t-butyl methacrylate, 0.5 g of 2-ethylhexyl acrylate, 9.0 g of styrene, 25.0 g of hydroxyethyl methacrylate, 2.1 g of methacrylic acid, 18.0 g of α-methylstyrene, 10.1 g of N-butoxymethylacrylamide and 0.5 g of mercaprtopropionic acid, and 28.4 g of 3% aqueous solution of potassium persulfate were evenly added dropwise over 55 minutes. After completion of dropwise addition, the dropping funnel was washed with 3.6 g of deionized water to complete the second-stage of polymerization and give composition (1B).

Forty-five (45) minutes after completion of the above second-stage polymerization, 18.0 g of 2.5% aqueous solution of sodium hydrogen persulfate was added to composition (1B) and the mixture was incubated for 2 hours to carry the polymerization to completion and give composition (1C).

The reaction mixture, i.e. resulting composition (1C), was cooled to room temperature and filtered through a 100-mesh metal screen to give an aqueous resin dispersion, i.e. resin composition (1). The components etc. used for polymerization are shown in Table 1.

Of the above resin composition (1), the nonvolatile fraction, weight average molecular weight (Mw) and average particle diameter were determined and the acid value, hydroxyl value, and Tg of the whole resin composition (1) were calculated. The results are presented in Table 1.

TABLE 1

| | | Example 1 | Example 2 | Example 3 | Example 4 | Example 5 | Example 6 |
|---|---|---|---|---|---|---|---|
| | Acid value | 15 | 15 | 15 | 15 | 15 | 15 |
| | Hydroxyl value | 120 | 120 | 120 | 120 | 80 | 40 |
| | Total Tg(° C.) | 48 | 20 | −9 | 75 | 75 | 76 |
| | First-stage Tg(° C.) | 30 | 2 | −15 | 60 | 60 | 60 |
| | Second-stage Tg(° C.) | 100 | 75 | 6 | 100 | 100 | 120 |
| First-stage composition | MAA | 4.8 g | 4.8 g | 4.8 g | 4.8 g | 4.8 g | 4.8 g |
| | HEMA | 58.4 g | 58.4 g | 58.4 g | 58.4 g | 38.9 g | 19.5 g |
| | HPMA | — | — | — | — | — | — |
| | CHMA | — | — | — | — | — | — |
| | t-BMA | 50.4 g | 20.0 g | 0.4 g | 76.7 g | 92.2 g | 106.7 g |
| | St | 21.0 g | — | 21.0 g | 21.0 g | 21.0 g | — |
| | 2EHA | 53.3 g | 84.8 g | 103.4 g | 27.1 g | 31.1 g | 37.0 g |
| | CHA | — | — | — | — | — | — |
| | α-Methylstyrene | 21.0 g | 42.0 g | 21.0 g | 21.0 g | 21.0 g | 42.0 g |
| | Mercaptopropionic acid | 1.0 g | — | 1.0 g | 1.0 g | 1.0 g | — |
| | TDM | — | — | — | — | — | — |
| | Total monomer | 210 g | 210 g | 210 g | 210 g | 210 g | 210 g |
| Emulsifier | 20% Aquaron BC-20 | 31.6 g | 31.6 g | 31.6 g | 31.6 g | 31.6 g | 31.6 g |
| Second-stage composition | MAA | 2.1 g | 2.1 g | 2.1 g | 2.1 g | 2.1 g | 2.1 g |
| | HEMA | 25.0 g | 25.0 g | 25.0 g | 25.0 g | 16.7 g | 8.4 g |
| | HPMA | — | — | — | — | — | — |
| | CHMA | — | — | — | — | — | — |
| | t-BMA | 33.9 g | 26.2 g | — | 33.9 g | 42.6 g | 46.4 g |
| | St | 9.0 g | — | 9.0 g | 9.0 g | 9.0 g | — |
| | 2EHA | 0.5 g | 8.6 g | 34.3 g | 0.4 g | 9.0 g | — |
| | CHA | — | — | — | — | — | — |
| | NBMAm | 10.1 g | 10.1 g | 10.1 g | 10.1 g | 10.1 g | 15.1 g |
| | Karenz MOI-BM | — | — | — | — | — | — |
| | α-Methylstyrene | 9.0 g | 18.0 g | 9.0 g | 9.0 g | 9.0 g | 18.0 g |
| | Mercaptopropionic acid | 0.5 g | — | 0.5 g | 0.5 g | 0.5 g | — |
| | TDM | — | — | — | — | — | — |
| | Total monomer | 90.0 g | 90.0 g | 90.0 g | 90.0 g | 90.0 g | 90.0 g |
| Emulsifier | 20% Aquaron BC-20 | 13.6 g | 13.6 g | 13.6 g | 13.6 g | 13.6 g | 13.6 g |
| Initiator | 3% KPS | 100 g | 100 g | 100 g | 100 g | 100 g | 100 g |
| | 6.9% PBH | — | — | — | — | — | — |
| | 3% RGT | — | — | — | — | — | — |
| Neutralizer to be added after completion of first-stage dropwise addition | 10% NaOH | 8.9 g | 8.9 g | 8.9 g | 8.9 g | 8.9 g | 17.6 g |
| | TEA | 1.1 g | 1.1 g | 1.1 g | 1.1 g | 1.1 g | — |
| Neutralizer to be added at completion of reaction | 25% NH₃ | — | — | — | — | — | — |
| | Nonvolatile matter (%) | 39.5% | 39.9% | 39.0% | 39.9% | 39.9% | 39.9% |
| | Weight average molecular weight | 75000 | 460000 | 70000 | 50000 | 50000 | 310000 |
| | Average particle diameter (nm) | 90 | 70 | 100 | 80 | 90 | 80 |
| | Appearance | ◯ | ◯ | ◯ | ◯ | ◯ | ◯ |
| | Gloss | 80 | 73 | 86 | 79 | 80 | 75 |
| | Pencil hardness | H | F | B | H | H | 2H |
| | Impact resistance | Not less than 50 cm | 30 cm | Not less than 50 cm | Not less than 50 cm | Not less than 50 cm | 35 cm |

TABLE 1-continued

|  | Example 1 | Example 2 | Example 3 | Example 4 | Example 5 | Example 6 |
|---|---|---|---|---|---|---|
| Erichsen | 8.21 mm | 7.45 mm | 8.71 mm | 8.10 mm | 7.86 mm | 7.50 mm |
| Solvent resistance | ◯ | ◯ | ◯ | ◯ | ◯ | ◯ |
| Water resistance | ◯ | ◯ | ◯ | ◯ | ◯ | ◯ |

The abbreviations used in Table 1 have the following meanings. The same applies to Table 4, Table 5, and Table 6.

"Total Tg" stands for Tg (glass transition temperature) of the whole resin composition, "first-stage Tg" for Tg of polymerizable unsaturated monomer composition constructing the first-stage and "second-stage Tg" for Tg of polymerizable unsaturated monomer composition constituting the second-stage. MAA stands for methacrylic acid, HEMA for hydroxyethyl methacrylate, HPMA for hydroxypropyl methacrylate, CHMA for cyclohexyl methacrylate, t-BMA for t-butyl methacrylate, St for styrene, 2EHA for 2-ethylhexyl acrylate, CHA for cyclohexyl acrylate, NBMAm for N-butoxymethylacrylamide, Karenz MOI-BM for one (product of Showa Denko K.K.) obtainable by causing butanone oxime to react with 2-isocyanate ethyl methacrylate, TDM for t-dodecylmercaptan, 3% KPS for 3% aqueous solution of potassium persulfate, 6.9% PBH for 6.9% aqueous solution of t-butylhydro peroxide, 3% RGT for 3% aqueous solution of Rongalit, 10% NaOH for 10% aqueous solution of sodium hydroxide, TEA for triethylamine, and 25% $NH_3$ for 25% aqueous ammonium solution.

Determination of the nonvolatile matter, weight average molecular weight (Mw) and average particle diameter of the above resin composition (1) and calculation of the Tg of the whole resin composition (1) were carried out as described hereinunder.

The acid value is the theoretical value calculated from the amount of the acid-containing unsaturated monomer occurring in the whole polymerizable unsaturated monomer. The hydroxyl value was likewise calculated.

<Nonvolatile Matter>

About 1 g of the obtained resin composition (1) was weighed and dried in a hot-air dryer at 105° C. for 1 hour, and the residue on drying was regarded as nonvolatile matter and expressed in mass % based on the pre-drying mass.

<Weight Average Molecular Weight (Mw)>

The Mw value was determined by GPC (the gel permeation chromatograph manufactured by Tosoh Corporation, product name: HLC-8120 GPC). As the column for molecular weight determination, TSK-GEL GMHXL-L and TSK-GEL G5000 HXL (both products of Tosoh Corporation) were used as connected in series. Tetrahydrofuran (THF) was used as the eluent and polystyrenes as standards.

<Average Particle Diameter>

Using the dynamic light-scattering particle size distribution analyzer (NICOMP Model 380J manufactured by Particle Sizing Systems, Inc.), the volume average particle diameter was determined.

<Glass Transition Temperature (Tg)>

Tg was calculated by means of the following expression of Fox.

$$1/Tg = \Sigma(Wn/Tgn)/100$$

where Wn represents the mass % of polymerizable monomer n present in 100 mass % of resin composition (1) and Tgn represents the Tg (absolute temperature) of a homopolymer composed of polymerizable monomer n. The Tgn of α-methylstyrene homopolymer and Tgn of N-butoxymethylacrylamide homopolymer were determined in the following manner and assumed to be 129° C. and 163° C., respectively.

[Tgn of α-methylstyrene Homopolymer]

The Tgn of α-methylstyrene homopolymer was determined by comparing the result of a computation using the physical property estimation module SYNTHIA in Cerius 2 (product of Accelrys Inc.) with the structural analog styrene whose measurement Tgn is known. The Tgn calculated, Tgn found, and Tgn used of each substance are presented in Table 2.

TABLE 2

|  | α-Methylstyrene | Styrene |
|---|---|---|
| Tgn calculated by SYNTHIA | 137.7° C.(410.7 K) | 108.7° C.(381.7 K) |
| Tgn found | — | 100° C.(373 K) |
| Tgn used | 129° C.(402 K) | 100° C.(373 K) |

1) Calculation by ratio 373 × (410.7/381.7) = 401.3(K) (=1.28.3° C.)
2) Calculation by addition-subtraction 373 + (410.7 − 381.7) = 402(K) (=129° C.)

Approximately equal values were obtained by calculations 1) and 2) and, therefore, the Tgn of α-methylstyrene was set at 129° C. (402K).

[Tgn of N-butoxymethylacrylamide Homopolymer]

The Tgn of N-butoxymethylacrylamide homopolymer was also determined in the same manner as the Tgn of α-methylstyrene by carrying out computation using SYNTHIA, comparing the result of a computation using SYNTHIA with the structural analog acrylamide whose measurement Tgn value is known. The Tgn calculated, Tgn found, and Tgn used of each substance are shown in Table 3.

TABLE 3

|  | N-Butoxymethylacrylamide | Acrylamide |
|---|---|---|
| Tgn calculated by SYNTHIA | 103° C.(376 K) | 93° C.(366 K) |
| Tgn found | — | 153° C.(426 K) |
| Tgn used | 163° C.(436 K) | 153° C.(426 K) |

1) Calculation by ratio 376 × (426/366) = 437.6(K) (=164.6° C.)
2) Calculation by addition-subtraction 426 + (376 − 366) = 436(K) (=163° C.)
Approximately equal values were obtained by calculations 1) and 2) and, therefore, the Tgn of N-butoxymethylacrylamide was set at 163° C. (436 K).

EXAMPLES 2 TO 6

Resin Compositions (2) to (6)

COMPARATIVE EXAMPLES 1 AND 2

Comparative Resin Compositions (1) and (2)

According to the formulas shown in Table 1, resin compositions (2) to (6) which are aqueous resin dispersions and comparative resin compositions (1) and (2) were obtained in the same manner as in Example 1.

Of each of these resin compositions (2) to (6) and comparative resin compositions (1) and (2), the nonvolatile matter, weight average molecular weight (Mw) and average particle diameter were determined, and the acid value, hydroxyl value, and Tg of the whole resin composition (2) to (6) and comparative resin compositions (1) and (2) were calculated as in Example 1. The results are presented in Table 1 and Table 4.

TABLE 4

|  |  | Comparative Example 1 | Comparative Example 2 |
|---|---|---|---|
|  | Acid value | 15 | 15 |
|  | Hydroxyl value | 80 | 80 |
|  | Total Tg(° C.) | 30 | 15 |
|  | First-stage Tg(° C.) | 15 | −5 |
|  | Second-stage Tg(° C.) | 75 | 75 |
| First-stage composition | MAA | 4.8 g | 4.8 g |
|  | HEMA | 38.9 g | 38.9 g |
|  | HPMA | — | — |
|  | CHMA | 43.4 g | — |
|  | t-BMA | — | 56.3 g |
|  | St | — | 21.0 g |
|  | 2EHA | 80.9 g | 89.0 g |
|  | CHA | — | — |
|  | α-Methylstyrene | 42.0 g | — |
|  | Mercaptopropionic acid | — | — |
|  | TDM | — | — |
|  | Total monomer | 210 g | 210 g |
| Emulsifier | 20% Aquaron BC-20 | 31.6 g | 31.6 g |
| Second-stage composition | MAA | 2.1 g | 2.1 g |
|  | HEMA | 16.7 g | 16.7 g |
|  | HPMA | — | — |
|  | CHMA | 50.1 g | — |
|  | t-BMA | — | 42.8 g |
|  | St | 9.0 g | 9.0 g |
|  | 2EHA | 3.1 g | 9.3 g |
|  | CHA | — | — |
|  | NBMAm | — | 10.1 g |
|  | Karenz MOI-BM | — | — |
|  | α-Methylstyrene | 9.0 g | — |
|  | Mercaptopropionic acid | — | — |
|  | TDM | — | — |
|  | Total monomer | 90.0 g | 90.0 g |
| Emulsifier | 20% Aquaron BC-20 | 13.6 g | 13.6 g |
| Initiator | 3% KPS | 100 g | 100 g |
|  | 6.9% PBH | — | — |
|  | 3% RGT | — | — |
| Neutralizer to be added after completion of first-stage dropwise addition | 10% NaOH | 8.9 g | 8.9 g |
|  | TEA | 1.1 g | 1.1 g |
| Neutralizer to be added at completion of reaction | 25% NH$_3$ | — | — |
|  | Nonvolatile matter (%) | 39.8% | 40.6% |
|  | Weight average molecular weight | 130000 | Not less than 1000000 |
|  | Average particle diameter (nm) | 120 | 120 |
|  | Appearance | ○ | X |
|  | Gloss | 76 | 57 |
|  | Pencil hardness | F | F |
|  | Impact resistance | 35 cm | 40 cm |
|  | Erichsen | 8.25 mm | 8.51 mm |
|  | Solvent resistance | X | ○ |
|  | Water resistance | X | ○ |

EXAMPLE 7

Resin Composition (7)

A flask equipped with a dropping funnel, stirrer, nitrogen gas inlet pipe, thermometer, and reflux condenser was charged with 205.2 g of deionized water.

In the dropping funnel, a preemulsion was prepared from 42.0 g of 20% aqueous solution of Aquaron BC-20, 58.4 g of deionized water, 27.2 g of t-butyl methacrylate, 73.7 g of 2-ethylhexyl acrylate, 21.0 g of styrene, 64.7 g of hydroxypropyl methacrylate, 2.4 g of methacrylic acid, 21.0 g of α-methylstyrene and 1.0 g of t-dodecylmercaptane, and a 6.9 g (1%) portion of the preemulsion was added to the flask. While nitrogen gas was gently bubbled through the mixture, the temperature was increased to 85° C. under stirring. After this increase of temperature, 5.0 g of 3% aqueous solution of potassium persulfate was added to the mixture to initiate polymerization. At this point of time, the internal temperature of the reaction system was increased to 90° C. over 30 minutes. The process up to this stage was termed prepolymerization.

After completion of prepolymerization, with the internal temperature of the reaction system being maintained at 90° C., the remainder of the preemulsion prepared as above and 67.1 g of 3% aqueous solution of potassium persulfate were evenly added dropwise over 125 minutes. After dropwise addition, the dropping funnel was washed with 8.4 g of deionized water and the washings were added to the flask to complete the polymerization and give resin composition (7A).

Then, 8.9 g of 10% aqueous solution of sodium hydroxide and 1.1 g of triethylamine were added to the composition (7A) and the mixture was stirred at the same temperature for 30 minutes.

Thereafter, a second-stage preemulsion composed of 18.0 g of 20% aqueous solution of Aquaron BC-20, 25.0 g of deionized water, 28.9 g of t-butyl methacrylate, 3.8 g of 2-ethylhexyl acrylate, 9.0 g of styrene, 27.7 g of hydroxypropyl methacrylate, 1.1 g of methacrylic acid and 9.0 g of α-methylstyrene, and 30.9 g of 3% aqueous solution of potassium persulfate were uniformly added dropwise over 55 minutes. After completion of dropwise addition, the dropping funnel was washed with 3.6 g of deionized water to complete the second-stage polymerization and give resin composition (7B).

Forty-five (45) minutes after completion of second-stage polymerization, 18.0 g of 2.5% aqueous solution of sodium hydrogen persulfate was added to the resin composition (7B) and the system was incubated for 2 hours to complete polymerization and give resin composition (7C).

The reaction mixture, i.e. resin composition (7C), was cooled to room temperature and filtered through a 100-mesh metal screen to give resin composition (7) as an aqueous resin dispersion. The components etc. used for polymerization are shown in Table 5.

Of the resin composition (7) thus obtained, the nonvolatile matter, weight average molecular weight (Mw), and average particle diameter were determined and the acid value, hydroxyl value, and Tg of the whole resin composition (7) were calculated as in Example 1. The results are presented in Table 5.

TABLE 5

|  |  | Example 7 | Example 8 | Example 9 | Example 10 | Example 11 | Example 12 |
|---|---|---|---|---|---|---|---|
|  | Acid value | 8 | 8 | 8 | 8 | 8 | 8 |
|  | Hydroxyl value | 120 | 120 | 120 | 120 | 120 | 120 |
|  | Total Tg(° C.) | 20 | 20 | 20 | 20 | 10 | 26 |
|  | First-stage Tg(° C.) | 2 | 2 | 2 | 2 | −17 | 2 |
|  | Second-stage Tg(° C.) | 75 | 75 | 75 | 75 | 108 | 100 |
| First-stage composition | MAA | 2.4 g | 2.4 g | 2.4 g | 2.4 g | 2.4 g | 2.4 g |
|  | HEMA | — | 38.9 g | 58.4 g | 58.4 g | 58.4 g | — |
|  | HPMA | 64.7 g | 21.6 g | — | — | — | 64.7 g |
|  | CHMA | — | — | — | — | — | — |
|  | t-BMA | 27.2 g | 24.1 g | 23.0 g | 24.8 g | — | 23.3 g |
|  | St | 21.0 g | 21.0 g | 21.0 g | 42.0 g | 21.0 g | — |
|  | 2EHA | 73.7 g | 80.0 g | 83.2 g | 81.4 g | 106.8 g | 75.5 g |
|  | CHA | — | — | — | — | — | — |
|  | α-Methylstyrene | 21.0 g | 21.0 g | 21.0 g | — | 21.0 g | 42.0 g |
|  | Mercaptopropionic acid | — | — | — | — | — | — |
|  | TDM | 1.0 g | 1.0 g | 1.0 g | 1.0 g | 0.4 g | 2.1 g |
|  | Total monomer | 210 g | 210 g | 210 g | 210 g | 210 g | — |
| Emulsifier | 20% Aquaron BC-20 | 42.0 g | 42.0 g | 42.0 g | 42.0 g | 42.0 g | 42.0 g |
| Second-stage composition | MAA | 1.1 g | 1.1 g | 1.1 g | 1.1 g | 1.1 g | 1.1 g |
|  | HEMA | — | 16.7 g | 25.0 g | 25.0 g | 25.0 g | — |
|  | HPMA | 27.7 g | 9.2 g | — | — | — | 27.7 g |
|  | CHMA | — | — | — | — | — | — |
|  | t-BMA | 28.9 g | 28.1 g | 5.2 g | 28.4 g | — | 1.5 g |
|  | St | 9.0 g | 9.0 g | 9.0 g | 18.0 g | — | — |
|  | 2EHA | 3.8 g | 6.4 g | 10.0 g | 7.0 g | 6.6 g | 0.5 g |
|  | CHA | — | — | — | — | — | — |
|  | NBMAm | 10.1 g | 10.1 g | 30.3 g | 10.1 g | 60.5 g | 40.3 g |
|  | Karenz MOI-BM | — | — | — | — | — | — |
|  | α-Methylstyrene | 9.0 g | 9.0 g | 9.0 g | — | 9.0 g | 18.0 g |
|  | Mercaptopropionic acid | — | — | — | — | — | — |
|  | TDM | 0.4 g | 0.4 g | 0.4 g | 0.4 g | 0.4 g | 0.9 g |
|  | Total monomer | 90.0 g | 90.0 g | 90.0 g | 90.0 g | 90.0 g | 90.0 g |
| Emulsifier | 20% Aquaron BC-20 | 18.0 g | 18.0 g | 18.0 g | 18.0 g | 18.0 g | 18.0 g |
| Initiator | 3% KPS | 100 g | 100 g | 100 g | 100 g | 100 g | 100 g |
|  | 6.9% PBH | — | — | — | — | — | — |
|  | 3% RGT | — | — | — | — | — | — |
| Neutralizer to be added after completion of first-stage dropwise addition | 10% NaOH | 8.9 g | 8.9 g | 8.9 g | 8.9 g | 8.9 g | 8.9 g |
|  | TEA | 1.1 g | 1.1 g | 1.1 g | 1.1 g | 1.1 g | 1.1 g |
| Neutralizer to be added at completion of reaction | 25% NH$_3$ | — | — | — | — | — | — |
|  | Nonvolatile matter (%) | 39.7% | 39.8% | 39.8% | 40.1% | 40.0% | 39.8% |
|  | Weight average molecular weight | 30000 | 30000 | 30000 | 40000 | 32000 | 25000 |
|  | Average particle diameter (nm) | 120 | 110 | 110 | 120 | 110 | 124 |
|  | Appearance | ◎ | ◎ | ○ | ○ | ○ | ◎ |
|  | Gloss | 92 | 90 | 89 | 85 | 86 | 85 |
|  | Pencil hardness | H | H | F | F | HB | F |
|  | Impact resistance | Not less than 50 cm | Not less than 50 cm | Not less than 50 cm | Not less than 50 cm | Not less than 50 cm | Not less than 50 cm |
|  | Erichsen | 8.35 mm | 8.25 m | 8.03 mm | 7.98 mm | 8.21 mm | 7.84 mm |
|  | Solvent resistance | ○ | ○ | ○ | ○ | ○ | ○ |
|  | Water resistance | ○ | ○ | ○ | ○ | ○ | ○ |

EXAMPLES 8 TO 12

Resin Compositions (8) to (12)

According to the formula of Table 5, resin compositions (8) to (12) were prepared as an aqueous resin dispersion in otherwise the same manner as in Example 1.

EXAMPLE 13

Resin Composition (13)

A flask equipped with a dropping funnel, stirrer, nitrogen gas inlet pipe, thermometer, and reflux condenser was charged with 234.6 g of deionized water.

In the dropping funnel, a preemulsion for first-stage polymerization was prepared from 31.6 g of 20% aqueous solution of Aquaron BC-20, 58.5 g of deionized water, 32.4 g of cyclohexyl acrylate, 72.4 g of 2-ethylhexyl acrylate, 58.4 g of hydroxyethyl methacrylate, 4.8 g of methacrylic acid, and 42.0 g of α-methylstyrene, and a 27.0 g (9%) portion of the preemulsion was added to the flask. While nitrogen gas was gently bubbled through the mixture, the temperature was increased to 85° C. under stirring. After this increase of temperature, 4.4 g of 6.9% aqueous solution of t-butylhydro peroxide (product name: Perbutyl H, product of NOF Corporation) and 5.0 g of 3% aqueous solution of Rongalit were added to the preemulsion to initiate polymerization. At this point of time the internal temperature of the reaction system was increased to 90° C. over 30 minutes. The process up to this stage was termed prepolymerization.

After completion of prepolymerization, with the internal temperature of the reaction system being maintained at 90° C., the remainder of the first-stage preemulsion prepared above, 26.8 g of 6.9% aqueous solution of Perbutyl H and 30.8 g of 3% aqueous solution of Rongalit were uniformly added dropwise over 125 minutes. After completion of dropwise addition, the dropping funnel was washed with 8.4 g of deionized water and the washings were added to the flask to complete first-stage polymerization and give composition (13A).

Then, 11.7 g of 10% aqueous solution of sodium hydroxide was added to the composition (13A) and the mixture was stirred at the same temperature for 30 minutes.

Thereafter, a second-stage preemulsion composed of 13.6 g of 20% aqueous solution of Aquaron BC-20, 25.1 g of deionized water, 17.5 g of cyclohexyl methacrylate, 17.3 g of cyclohexyl acrylate, 25.0 g of hydroxyethyl methacrylate, 2.1 g of methacrylic acid, 18.0 g of α-methylstyrene, and 10.1 g of N-butoxymethylacrylamide, 12.4 g of 6.9% aqueous solution of t-butylhydro peroxide and 14.2 g of 3% aqueous solution of Rongalit were uniformly added dropwise over 55 minutes. After completion of dropwise addition, the dropping funnel was washed with 3.6 g of deionized water to complete the second-stage polymerization and give composition (13B).

Forty-five (45) minutes after completion of second-stage polymerization, 1.4 g of 41.4% aqueous solution of t-butylhydro peroxide and 12.0 g of 5% aqueous solution of Rongalit were added to the composition (13B) and the system was incubated for 2 hours to complete polymerization, and after being cooled to room temperature, the composition was added with 5.4 g of 25% aqueous ammonium solution, stirred for 15 minutes and thereafter filtered through a 100-mesh metal screen to give the resin composition (13) as an aqueous resin dispersion. The components etc. used for polymerization are shown in Table 6.

Of the above resin composition (13), the nonvolatile matter, weight average molecular weight (Mw) and average particle diameter were determined and the acid value, hydroxyl value, and Tg of the whole resin composition (13) were also calculated as in Example 1. The results are presented in Table 6.

TABLE 6

|  |  | Example 13 | Example 14 | Example 15 |
|---|---|---|---|---|
|  | Acid value | 15 | 15 | — |
|  | Hydroxyl value | 120 | 120 | — |
|  | Total Tg(° C.) | 20 | 48 | — |
|  | First-stage Tg(° C.) | 2 | 2 | — |
|  | Second-stage Tg(° C.) | 75 | 75 | — |
| First-stage composition | MAA | 4.8 g | 2.4 g | — |
|  | HEMA | 58.4 g | — | — |
|  | HPMA | — | 64.7 g | — |
|  | CHMA | — | — | — |
|  | t-BMA | — | 26.1 g | — |
|  | St | — | 21.0 g | — |
|  | 2EHA | 72.4 g | 73.8 g | — |
|  | CHA | 32.4 g | — | — |
|  | α-Methylstyrene | 42.0 g | 21.0 g | — |
|  | Mercaptopropionic acid | — | — | — |
|  | TDM | — | 1.0 g | — |
|  | Total monomer | 210 g | 210 g | — |
| Emulsifier | 20% Aquaron BC-20 | 31.6 g | 42.0 g | — |
| Second-stage composition | MAA | 2.1 g | 1.1 g | — |
|  | HEMA | 25.0 g | — | — |
|  | HPMA | — | 27.7 g | — |
|  | CHMA | 17.5 g | — | — |
|  | t-BMA | — | 27.2 g | — |
|  | St | — | 9.0 g | — |
|  | 2EHA | — | — | — |
|  | CHA | 17.3 g | — | — |
|  | NBMAm | 10.1 g | — | — |
|  | Karenz MOI-BM | — | 15.6 g | — |
|  | α-Methylstyrene | 18.0 g | 9.0 g | — |
|  | Mercaptopropionic acid | — | — | — |
|  | TDM | — | 0.4 g | — |
|  | Total monomer | 90.0 g | 90.0 g | — |
| Emulsifier | 20% Aquaron BC-20 | 13.6 g | 18.0 g | — |
| Initiator | 3% KPS | — | 100 g | — |
|  | 6.9% PBH | 43.6 g | — | — |
|  | 3% RGT | 50.0 g | — | — |
| Neutralizer to be added after completion of first-stage dropwise addition | 10% NaOH | 11.7 g | 8.9 g | — |
|  | TEA | — | 1.1 g | — |
| Neutralizer to be added at completion of reaction | 25% NH$_3$ | 5.4 g | — | — |

TABLE 6-continued

|  | Example 13 | Example 14 | Example 15 |
| --- | --- | --- | --- |
| Nonvolatile matter (%) | 39.0% | 39.6% | — |
| Weight average molecular weight | 60000 | 50000 | — |
| Average particle diameter (nm) | 200 | 120 | — |
| Appearance | ○ | ○ | ◎ |
| Gloss | 85 | 80 | 83 |
| Pencil hardness | F | H | 2H |
| Impact resistance | Not less than 50 cm | Not less than 50 cm | Not less than 50 cm |
| Erichsen | 8.10 mm | 8.21 mm | 8.01 mm |
| Solvent resistance | ○ | ○ | ○ |
| Water resistance | ○ | ○ | ○ |

EXAMPLE 14

Resin Composition (14)

According to the formulating ratio etc. indicated in Table 6 and according to the polymerization process indicated in Example 13 except formulating amount and reaction temperature, resin composition (14) was obtained as an aqueous resin dispersion with the prepolymerization initiation temperature of 75° C., the prepolymerization completion temperature of 80° C. and the reaction temperature of 80° C.

2. Physical Properties of the Coating Film (1)-1 Construction of a Coating Film 100 g each of one of the resin compositions (1) to (14) and comparative resin compositions (1) and (2) was added with aqueous dispersion type polyisocyanate obtained by mixing Takenate WD-725 (aqueous dispersion type polyisocyanate, isocyanate group content: 16.5%, product of Mitsui Takeda Chemicals, Inc.) and Desmodur VPLS2294 (solvent type polyisocyanate, isocyanate group content: 23%, product of Sumika Bayer Urethane Co., Ltd.) in the ratio of 4:1 so as to obtain hydroxyl group/isocyanate group=1/1.5 (equivalent ratio), further added with 2 g of EFKA3580 (product of EFKA Additives) and 10 g of diacetone alcohol to prepare a coating composition. Thereafter, deionized water was added to obtain a coating viscosity of 10 seconds by Iwata cup. Zinc-phosphated steel sheet was coated with a black two-component polyurethane resin coating and the above coating composition was then applied in a dry film thickness of 30 μm by the spray-coating technique. The applied coat was subjected to 15 minutes' setting at room temperature, 15 minutes' flash-off at 60° C. and 30 minutes' baking at 160° C. to give a testpiece.

(1-)-2 Construction of a Coating Film

The case in which an oxazoline resin was used in combination (Example 15)

The resin composition (5) (100 g) was added with 20.2 g of polyisocyanate (hydroxyl group/isocyanate group=1/1.5 (equivalent ratio)) prepared in the above (1)-1, 14.8 g of EPOCROS WS-700 (an oxazoline resin, product of Nippon Shokubai Co., Ltd.), 2 g of EFKA3580 and 10 g of diacetone alcohol to prepare a coating composition. Thereafter, deionized water was added to obtain a coating viscosity of 10 seconds by Iwata cup. Zinc-phosphated steel sheet was coated with a black two-component polyurethane resin coating and the above coating composition was then applied in a dry film thickness of 30 μm by the spray-coating technique. The resulting coat was subjected to 15 minutes' setting at room temperature, 15 minutes' flash-off at 60° C. and 30 minutes' baking at 160° C. to give a testpiece.

(2) Evaluation of Physical Properties

The testpiece prepared as above was subjected to the determination and evaluation of physical properties. The results are presented in Tables 1, 4, 5, and 6.

<Appearance>

The condition (the presence or absence of aggregates, surface irregularity, and gloss) of the coating film was visually evaluated.

◎: excellent, ○: good, X: poor

<Gloss Value>

In accordance with JIS K 5400, using VZ-2000 (product name, manufactured by Nippon Denshoku Industries Co., Ltd.), the gloss value was measured at a light beam incidence angle of 20°.

<Pencil Hardness>

In accordance with JIS K 5400 8.4.1 (testing machine method), a pencil scratch test was performed and the pencil hardness injuring the coating film was recorded as the hardness value.

<Impact Resistance>

In accordance with JIS K 5400 8.3.2 (DuPont method), a test was performed with a 500-gram weight to evaluate the impact resistance according to the falling distance at which a defect was caused in the coating film.

<Erichsen Value>

It was evaluated by the breaking distance method according to JIS K 5400.

<Solvent Resistance>

Using a wad of sanitary cotton wet with methyl ethyl ketone, the coating film was rubbed against for a total of 50 times and the condition of the coating film surface was visually examined and rated on the following scale.

○: unchanged, X: injured.

<Water Resistance>

A strip of coating film was immersed in warm water at 40° C. for 10 days and the change in condition of the coating film was visually evaluated.

○: No change, X: fogging, blushing, swelling, or peeling occurs.

INDUSTRIAL APPLICABILITY

The present invention, which is constituted as described above, can provide an emulsion polymer resin composition which can be applied with advantage to a curable composition which is not only conducive to a excellent appearance in terms of gloss, image sharpness, apparent thickness, etc. but is outstanding in curability and storage stability, contributory to cost reduction, capable of forming a coating film having excellent physical properties in terms of hardness, impact resistance, scratch resistance, acid rain resistance, and weather resistance, and contributory to a reduced VOC release.

The present application claims priority under 35 U.S.C. §119 to Japanese Patent Application No. 2002-121091, filed Apr. 23, 2002, entitled "CURABLE ACRYLIC EMULSION COMPOSITION". The content of this application is incorporated herein by reference in its entirety.

The invention claimed is:

1. An emulsion polymer resin composition which contains a hydroxyl group and a functional group reactive with a hydroxyl group within the same particle and has a weight average molecular weight of not less than 10000 but not more than 500000 and an average particle diameter is not less than 50 nm but not more than 300 nm, wherein said emulsion polymer resin composition is obtained by polymerizing a polymerizable unsaturated monomer composition comprising, as essential components, a polymerizable unsaturated monomer having a hydroxyl group and a polymerizable unsaturated monomer having an alkoxyalkylamide group and/or a blocked isocyanate group, and wherein the polymerizable unsaturated monomer composition contains α-methylstyrene, and wherein the α-methylstyrene content in 100 mass % of the polymerizable unsaturated monomer composition is not less than 1 mass % but not more than 50 mass %, and wherein the ratio of equivalent amount of the functional groups of the polymerizable unsaturated monomer having a hydroxyl group to the polymerizable unsaturated monomer having a functional group reacts with a hydroxyl group in the polymerizable unsaturated monomer composition is 100/5 to 100/100.

2. A curable composition comprising the emulsion polymer resin composition according to claim 1 and a crosslinking agent, wherein said crosslinking agent is a (blocked) polyisocyanate compound and/or an aminoplast resin.

3. A cured coating film formed by coating and heat-curing the curable composition according to claim 2.

4. The emulsion polymer resin composition according to claim 1, wherein the α-methylstyrene content in 100 mass % of the polymerizable unsaturated monomer composition is not less than 5 mass % but not more than 30 mass %.

* * * * *